United States Patent
Atasu

(10) Patent No.: US 10,467,272 B2
(45) Date of Patent: *Nov. 5, 2019

(54) DETECTING LONGEST REGULAR EXPRESSION MATCHES

(71) Applicant: International Business Machines Corporation, Armonk, NY (US)

(72) Inventor: Kubilay Atasu, Horgen (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 611 days.

This patent is subject to a terminal disclaimer.

(21) Appl. No.: 14/953,455

(22) Filed: Nov. 30, 2015

(65) Prior Publication Data

US 2017/0083616 A1   Mar. 23, 2017

Related U.S. Application Data

(63) Continuation of application No. 14/859,379, filed on Sep. 21, 2015.

(51) Int. Cl.
*G06F 16/335* (2019.01)
*G06F 16/33* (2019.01)
*G06F 16/903* (2019.01)

(52) U.S. Cl.
CPC ........ *G06F 16/335* (2019.01); *G06F 16/3344* (2019.01); *G06F 16/90344* (2019.01)

(58) Field of Classification Search
CPC ......... G06F 17/30699; G06F 17/30684; G06F 17/30985
See application file for complete search history.

(56) References Cited

U.S. PATENT DOCUMENTS 6,496,481 B1 * 12/2002 Wu .................. H04L 1/1628
                                                           370/242
8,943,085 B2     1/2015 Ruehle
(Continued)

OTHER PUBLICATIONS

Kubilay Atasu, "Detecting Longest Regular Expression Matches", U.S. Appl. No. 14/859,379, filed Sep. 21, 2015.
(Continued)

*Primary Examiner* — Ashish Thomas
*Assistant Examiner* — Dustin D Eyers
(74) *Attorney, Agent, or Firm* — Cantor Colburn LLP; Daniel Morris

(57) ABSTRACT

In one embodiment, a computer-implemented method includes receiving a regular expression (regex) and input data. One or more spans are identified representing one or more matches in which the regex matches at least a portion of the input data. Each span corresponds to a corresponding match and includes a start offset of the corresponding match in the input data and an end offset of the corresponding match in the input data. The one or more matches are identified in a sequence. An order of the sequence of the one or more spans is modified. One or more filtered spans are generated, by a computer processor, by filtering out a subset of the one or more spans that are each contained by at least one other span in the one or more spans. The identifying, the modifying, and the filtering are performed at streaming rate.

8 Claims, 13 Drawing Sheets

(56) References Cited

U.S. PATENT DOCUMENTS

| | | | |
|---|---|---|---|
| 8,990,619 B1* | 3/2015 | Vincent | G06F 8/65 |
| | | | 714/19 |
| 2010/0198777 A1* | 8/2010 | Lo | G06F 17/30592 |
| | | | 707/601 |
| 2011/0093496 A1* | 4/2011 | Bando | G06F 17/30985 |
| | | | 707/769 |
| 2012/0158635 A1* | 6/2012 | Van Lunteren | G06N 5/025 |
| | | | 706/48 |
| 2012/0233418 A1* | 9/2012 | Barton | G06F 17/30575 |
| | | | 711/162 |
| 2013/0086096 A1* | 4/2013 | Indeck | G06F 17/30312 |
| | | | 707/758 |
| 2013/0133064 A1* | 5/2013 | Goyal | H04L 63/0254 |
| | | | 726/22 |
| 2013/0283018 A1* | 10/2013 | Ould-Ahmed-Vall | |
| | | | G06F 9/30043 |
| | | | 712/225 |
| 2014/0244554 A1 | 8/2014 | Atasu et al. | |

OTHER PUBLICATIONS

List of IBM Patents or Patent Applications Treated as Related; (Appendix P), Filed Feb. 9, 2016; 2 pages.

* cited by examiner

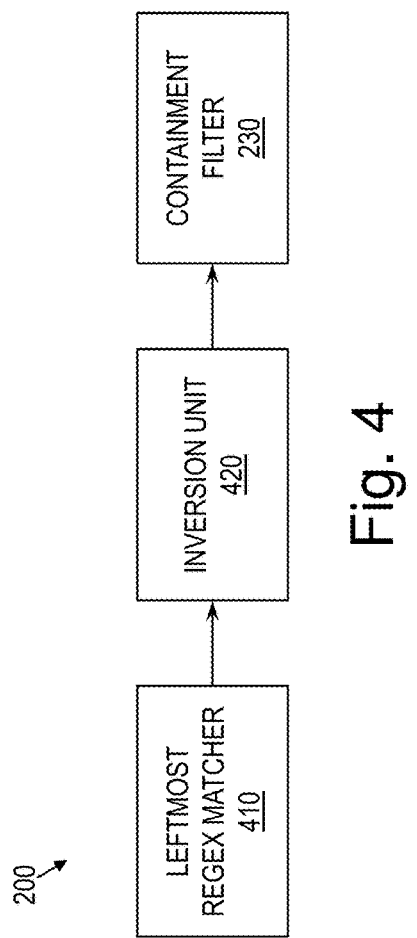

DETECTING LONGEST REGULAR EXPRESSION MATCHES

DOMESTIC PRIORITY

This application is a continuation of U.S. patent application Ser. No. 14/859,379, filed Sep. 21, 2015, and all the benefits accruing therefrom under 35 U.S.C. § 119, the contents of which is herein incorporated by reference in its entirety.

BACKGROUND

Embodiments of the present invention relate to regular expressions and, more specifically, to longest regular expression matches.

The process of extracting information from large-scale unstructured text is called text analytics and has various applications in business analytics, healthcare, security intelligence domains, and other fields. Analyzing unstructured text and extracting insights hidden in that text at a high bandwidth and at a low latency are computationally challenging tasks. In particular, text analytics functions rely heavily on regular expressions (regexes).

Consider, for example, a text analytics platform that continuously collects news entries from various data sources. When a user submits a news search query that contains a set of keywords, including a company name and the word "Germany," the news search engine retrieves from its index all news entries that contain these keywords. The relevant news entries are then parsed to identify phrases, which might, for instance, reveal a business expansion strategy into Germany. This second stage acts as a second level of filtering, and only entries that contain interesting and useful information are transferred to the user, preferably quickly.

Further, this second stage requires a deeper analysis of the news entries and is, thus, computationally more intensive than a simple keyword search. When thousands of users submit news search queries concurrently, this second stage becomes a computational bottleneck. One way of eliminating this bottleneck is to scale up the number of processor cores in the text analytics platform, which results in increased space and energy consumption as well as degraded reliability.

Regex searching can help with tasks like the above, as well as other tasks involving natural language processing, by pattern matching when the analytics system does not know how the company name and the term "Germany" will appear in relation to each other. A regex is an expression used to define a search pattern, as opposed to a specific search string. Compared to string searches, regexes provide more flexibility within a search.

Text analytics systems compute a span, often stored in a span data structure, for each regex match. Each span includes a start offset and an end offset, where the start offset indicates a position in the searched text at which the match begins, and the end offset indicates a position at which the match ends.

To eliminate ambiguity, text analytics systems often employ well-defined tie-break heuristics when dealing with overlapping matches. For example, when multiple regex matches have the same end offset, typically only the span with the smallest start offset is reported. This technique is referred to as a leftmost matching heuristic. A more common heuristic is called leftmost longest matching, which requires computation of the leftmost regex matches that are not contained by other regex matches.

SUMMARY

According to an embodiment of this disclosure, a computer-implemented method includes receiving a regular expression (regex) and input data. One or more spans are identified representing one or more matches in which the regex matches at least a portion of the input data. Each span of the one or more spans corresponds to a corresponding match of the one or more matches, and includes a start offset of the corresponding match in the input data and an end offset of the corresponding match in the input data. The one or more matches are identified in a sequence. An order of the sequence of the one or more spans is modified. One or more filtered spans are generated, by a computer processor, by filtering out a subset of the one or more spans that are each contained by at least one other span in the one or more spans. The identifying, the modifying, and the filtering are performed at streaming rate.

In another embodiment, a system includes a memory and one or more computer processors communicatively coupled to the memory. The one or more computer processors are configured to receive a regex and input data. The one or more computer processors are further configured to identify one or more spans representing one or more matches in which the regex matches at least a portion of the input data. Each span of the one or more spans corresponds to a corresponding match of the one or more matches, and includes a start offset of the corresponding match in the input data and an end offset of the corresponding match in the input data. The one or more matches are identified in a sequence. The one or more computer processors are further configured to modify an order of the sequence of the one or more spans. The one or more computer processors are further configured to generate one or more filtered spans by filtering out a subset of the one or more spans that are each contained by at least one other span in the one or more spans. The one or more computer processors are further configured to perform the identifying, the modifying, and the filtering at streaming rate.

In yet another embodiment, a computer program product for matching regular expressions includes a computer readable storage medium having program instructions embodied therewith. The program instructions are executable by a processor to cause the processor to perform a method. The method includes receiving a regex and input data. Further according to the method, one or more spans are identified representing one or more matches in which the regex matches at least a portion of the input data. Each span of the one or more spans corresponds to a corresponding match of the one or more matches, and includes a start offset of the corresponding match in the input data and an end offset of the corresponding match in the input data. The one or more matches are identified in a sequence. An order of the sequence of the one or more spans is modified. One or more filtered spans are generated, by a computer processor, by filtering out a subset of the one or more spans that are each contained by at least one other span in the one or more spans. The identifying, the modifying, and the filtering are performed at streaming rate.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4 is another block diagram of the matching system 200, according to some embodiments of this disclosure;

DETAILED DESCRIPTION

Various embodiments of this disclosure compute longest regular expression (regex) matches, including leftmost longest and rightmost longest regex matches. Embodiments can be used, for example, in natural language processing. Some embodiments can also be used to identify credit card fraud by matching regexes representing credit card numbers, or to identify other search results based on pattern matching.

Generally, each regex match is associated with a span (S, E), where S is the start offset and E is the end offset within a set of input data. The span $(s_0, e_0)$ contains the span $(s_1, e_1)$, if $s_1 \geq s_0$ and $e_1 \leq e_0$. Further, herein, the leftmost regex match at offset position i is defined as the regex match with the smallest start offset that ends at offset position i (i.e., has an end offset of i). A leftmost longest regex match is a regex match that is not contained by any other regex match, and is thus also a leftmost regex match.

Figure 1:
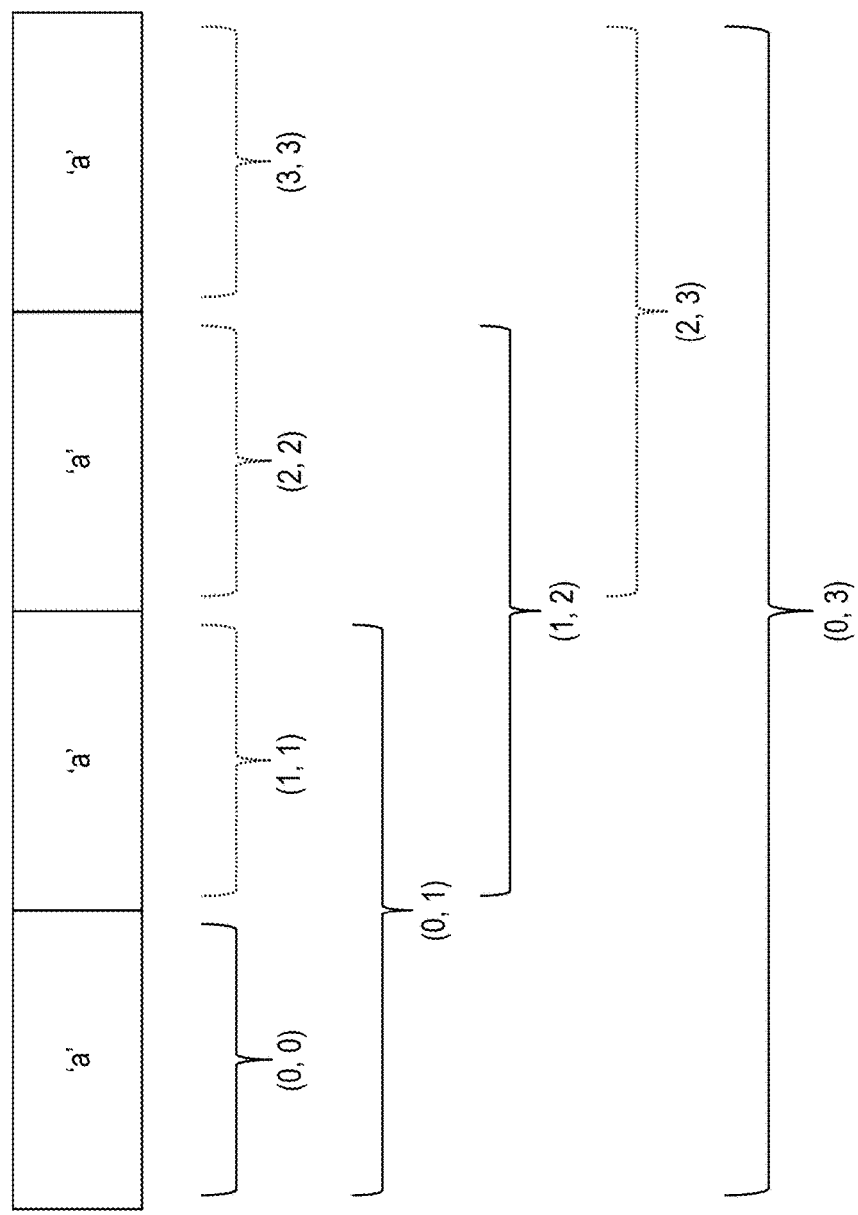
FIG. 1 is an example result of leftmost regex matching, according to some embodiments of this disclosure.

FIG. 1 is an example result of matching for the regex a|aa|aaaa within the depicted input stream "aaaa," according to some embodiments. As shown, eight matches are identified in this example. Each match is uniquely identified by its span (i.e., its combination of start offset and end offset), and each span is shown in parentheses in the figure. Only four of these eight are leftmost matches, specifically (0, 0), (0, 1), (1, 2), and (0, 3), and these four are indicated by solid brackets, as opposed to the dashed brackets used to indicate the matches that are not leftmost. For instance, the leftmost match at the end offset of 1 has the span (0, 1), with a start offset of 0, which has a smaller start offset than the match associated with the span (1, 1). Therefore, a leftmost regex matcher may report the span (0, 1) and not the span (1, 1). At the end offset of 3, the leftmost match is associated with the span (0, 3), and the matches associated with the spans (2, 3) and (3, 3) are not leftmost matches.

Figure 2:
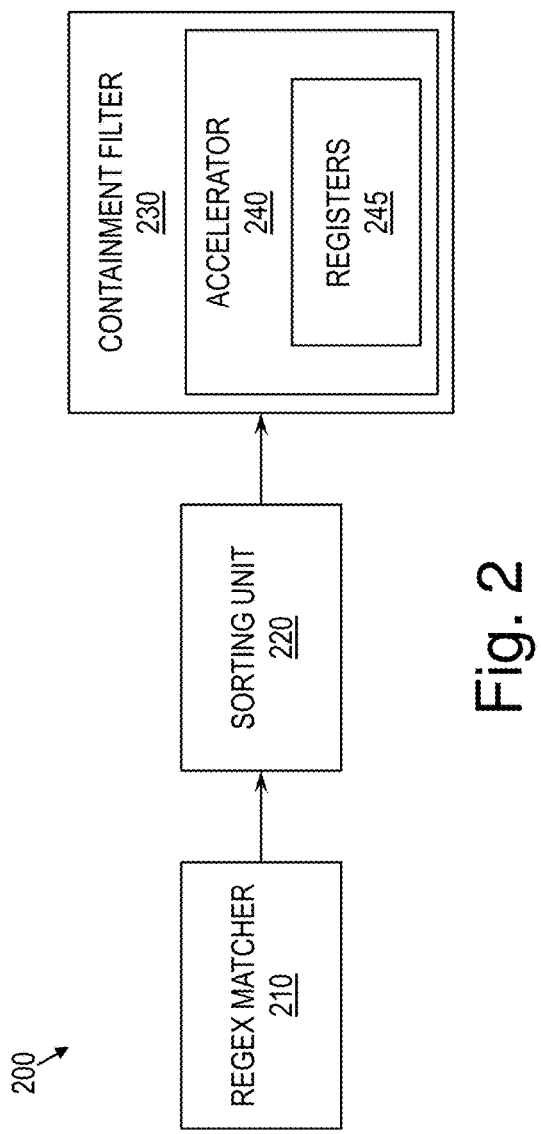
FIG. 2 is a block diagram of a matching system, according to some embodiments of this disclosure.

FIG. 2 is a block diagram of a matching system 200, according to some embodiments of this disclosure. As shown, the matching system 200 may include a regex matcher 210, a sorting unit 220, and a containment filter 230. The regex matcher 210, the sorting unit 220, and the containment filter 230 may include hardware, software, or a combination of both. Further, although these components are illustrated as being distinct, this need not be the case. For instance, the sorting unit 220 may be integrated into the regex matcher 210, such that regex matches are already sorted when they are output from the regex matcher 210.

In some embodiments, the regex matcher 210 outputs spans defining, and corresponding to, the matches identified when applying a regex to input data. Each outputted span may include a start offset and an end offset for the corresponding regex match. The sorting unit 220 may sort the spans based on various criteria. For example, and not by way of limitation, the sorting unit 220 may sort the spans received from the regex matcher 210 in order of increasing start offset, where spans with the same start offset are sorted in order of decreasing end offset. For another example, the spans may be sorted in order of decreasing end offset, where spans having the same end offset are sorted in order of increasing start offset.

The containment filter 230 may receive the sorted spans and may filter out the spans that are contained by other spans within those regex matches. Thus, the containment filer 230 may output a sorted stream of spans that correspond to the leftmost longest regex matches at the various end offsets.

In some embodiments, the matching system 200 may process the input data and output the leftmost longest matches at streaming rate. For the sake of this disclosure, streaming rate is a rate sufficient for the hardware involved, such as a hardware accelerator, to process the input data without stalling an incoming stream of the input data or other data.

The containment filter 230 may be integrated into a hardware accelerator 240, such as a field-programmable gate array (FPGA), and may have one or more local registers 245. The containment filter 230 may store a single span in its local registers 245 at a given time. In some embodiments, as discussed above, the spans are sorted in order of increasing start offset, where the spans having the same start offset are sorted in order of decreasing end offset. When the first span arrives at the containment filter 230, the containment filter 230 may store that span in the local registers 245.

New spans may arrive after a span is already stored in the registers 245. In some embodiments, if the end offset of a new span is smaller than or equal to the end offset of the span stored in the local registers 245, then due to the prior sorting operation, the start offset of the new span is greater than or equal to the start offset of the span stored in local registers 245. Therefore, the span stored in the local registers contains the new span, and the new span is therefore not a longest match. In this case, the containment filter 130 may filter out the new span so that the new span is not part of the output. The span currently stored in the registers 245 may remain unchanged.

However, in some embodiments, if the end offset of the new span is greater than the end offset of the span stored in the registers 245, then due to the prior sorting, the start offset of the new span is greater than the start offset of the span stored. Thus, in this case, neither span contains the other. The containment filter 230 may then add to the output the span currently stored in the registers 245, and may remove that span from the registers 245. The containment filter 230 may write the new span to the registers 245.

When the containment filter reaches the end of the input data, which may be an input stream from the sorting unit 220, the containment filter 230 may add to the output the span currently stored in its registers 245. In some embodiments, the output may be provided after the input data is fully processed, but in some other embodiments, the containment filter 230 may provide the output as a stream while receiving the input data as a stream.

For an example of the above, consider that the spans (0, 1), (2, 3), (2, 4), and (1, 5) are produced by the regex matcher 210. The sorting unit 220 may reorder the spans as {(0, 1), (1, 5), (2, 4), (2, 3)}. Upon receiving span (0, 1), the containment filter 230 stores this span in its registers 245. When span (1, 5) arrives, (0, 1) is written to output, and (1, 5) is written to the registers 245. Spans (2, 4) and (2, 3) are not leftmost longest matches and are filtered out because they have a larger start offset and a smaller end offset than (1, 5). Thus, these two spans are contained by the span (1, 5). When the containment filter 230 reaches the end of the input data, span (1, 5) is written to the output. The output thus includes the two leftmost longest regex matches: (0, 1) and (1, 5).

Alternatively, in some embodiments where the sorting unit 220 sorts the regex matches in order of decreasing end offset, and where the spans having the same end offset are sorted in order of increasing start offset, the containment unit 130 need compare only the start offsets. If the start offset of a new span is greater than or equal to the start offset of the span stored in the registers 245, the containment unit 130 may filter out the new span, and may leave the span in the registers 245 as is. On the other hand, if the start offset of the new span is smaller than the start offset of the span stored in the registers 245, the span stored in the registers may be added to the output, and the new span may be added to the registers 245.

Figure 3:
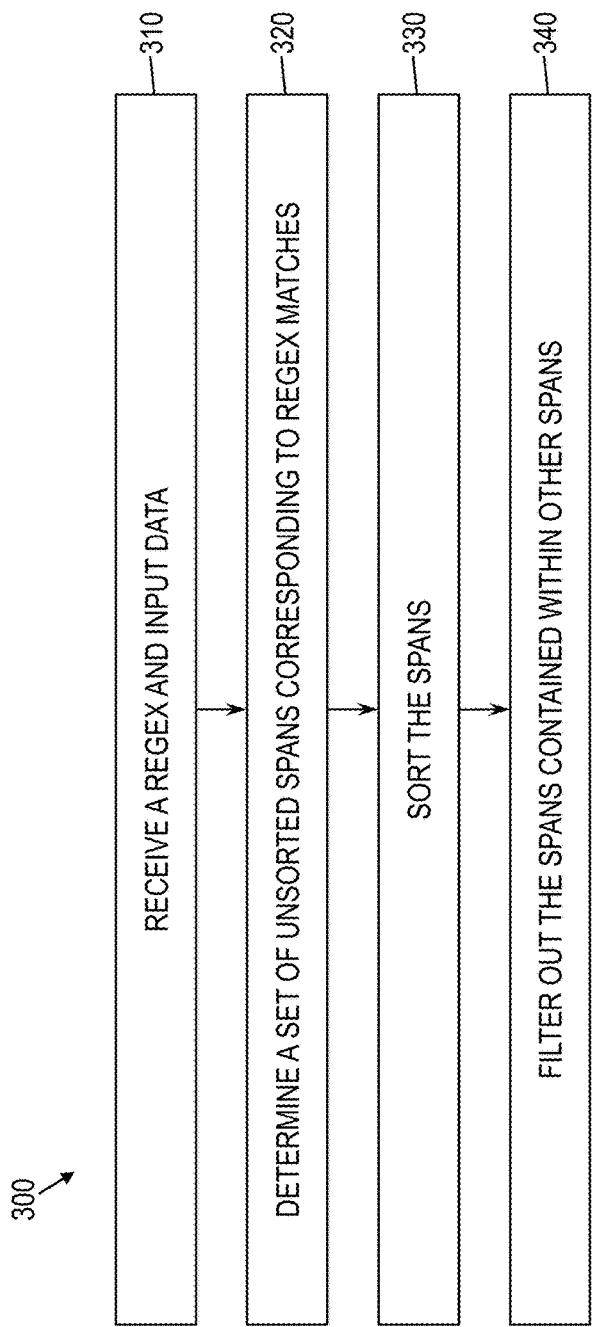
FIG. 3 is a flow diagram of a method for identifying leftmost longest regex matches, according to some embodiments of this disclosure.

FIG. 3 is a flow diagram of a method 300 of identifying leftmost longest regex matches, according to some embodiments of this disclosure. As shown, at block 310, the regex matcher 210 may receive a regex and input data, which may be an input stream. At block 320, the regex matcher 210 may determine a set of unsorted spans corresponding to the regex matches in the input data. At block 330, the sorting unit 220 may sort the spans corresponding to the regex matches. At block 340, the containment filter 230 may filter out the spans contained within other spans, and may thus identify the leftmost longest regex matches of the input data. It will be understood that various blocks of this method 300 may be performed in parallel as data is streamed through the regex matcher 210, the sorting unit 220, and the containment filter 230.

FIG. 4 is another block diagram of the matching system 200, according to some embodiments of this disclosure. As shown, in some embodiments, the matching system 200 may include a leftmost regex matcher 410, an inversion unit 420, and the containment filter 230. The containment filter 230 may behave as described above. The leftmost regex matcher 410 and the inversion unit 420 may include hardware, software, or a combination of both. Further, although the leftmost regex matcher 410, the inversion unit 420, and the containment filter 230 are illustrated as being distinct, this need not be the case. In some embodiments, as shown, no sorting unit 220 need be included. Although high-throughput FPGA-based sorter implementations exist for sorting, and might be used for the sorting unit 220 in the embodiments of FIG. 2, these sorter implementations can incur relatively high resource consumption compared to basic regex matcher implementations. Therefore, eliminating the sorting unit 220 may improve scalability of a leftmost longest regex matching architecture.

As noted above, a leftmost longest regex match is also a leftmost regex match. Thus, it is not necessary to generate all possible regex matches to locate the leftmost longest matches. Rather, it is sufficient to produce the leftmost matches and, among those, identify the leftmost longest matches.

Some leftmost regex matchers exist for identifying leftmost regex matches, and the leftmost regex matcher 410 herein may use one of such existing matchers. As in the existing art, the leftmost regex matcher 410 may provide partially sorted results. Specifically, for example, the leftmost regex matcher 410 may process the input data character by character, and at each end offset of the input data, the leftmost regex matcher 410 may report only the regex match with the smallest start offset (i.e., the leftmost regex match at the current end offset). This may enable the leftmost regex matcher 410 to produce the output spans in order of increasing end offset. Further, for each end offset, only a single span is included in this output of the leftmost regex matcher 410, where that span is the leftmost regex match with that end offset.

If the order of the spans produced by the leftmost regex matcher 410 are inverted, those spans are already sorted in order of decreasing end offset, according to some embodiments, and there are no two spans having the same end offset and different start offsets. Therefore, inverting the order of the spans produced by the leftmost regex matcher 410 may create a sorted stream of spans that can be consumed directly by the containment filter 230, which may operate as described above. The inversion unit 420 may perform this inversion, by reversing the order of the spans it receives from the leftmost regex matcher 410. Thus, in embodiments according to FIG. 4, the sequence of the spans may still be modified, as in FIG. 2, where sorting is performed, but in this case the modification may be achieved by inversion.

Consider again the example with spans (0, 1), (2, 3), (2, 4), and (1, 5). These spans may be generated by the leftmost regex matcher 410 in order of increasing end offset, {(0, 1), (2, 3), (2, 4), (1, 5)}. The inversion unit 420 may output these spans in the reverse order of {(1, 5), (2, 4), (2, 3), (0, 1)}. The containment filter 230 may remove the spans (2, 4) and (2, 3) and may output the spans (1, 5) and (0, 1). The output may be produced in order of decreasing start offsets and decreasing end offsets. In some embodiments, a further inversion may be performed to this output of the containment filter 230, to produce a final output that is sorted in order of increasing start offsets and end offsets, i.e., {(0, 1), (1, 5)}.

In some embodiments, the inversion unit 420 is implemented using a last-in-first-out (LIFO) queue. In other words, the inversion unit 420 may queue the input received from the leftmost regex matcher 410, and after all spans are received from the leftmost regex matcher 410, the inversion unit 420 may output them by starting with the last span received and proceeding to remove and output the spans in LIFO order. Thus, in some embodiments, the inversion unit 420 does not produce output until the leftmost regex matcher 410 has provided all the leftmost regex matches.

This latency, resulting from having to wait for all spans to be received, can reduce the throughput rate of the matching system 200. To hide this latency in the long term, spans corresponding to matches in subsequent input data may be processed in a pipeline fashion. For example, as soon as the leftmost regex matcher 410 finishes processing a first set spans associated with a first set of input data, the inversion unit 420 may begin accepting spans associated with a second set of input data, while also forwarding inverted spans of the first input data to the containment filter 230. This approach can be implemented without doubling the buffer space needed for the LIFO queue of the first set of input data. The buffer may include two modes, a forward mode and a backward mode, where each mode corresponds to a distinct LIFO queue corresponding to a distinct set of input data, or input stream. In other words, the buffer may be simultaneously used as a first LIFO queue for spans that are leftmost regex matchers of first input data and as a second LIFO queue for spans that are leftmost regex matches of second input data.

Figure 5B:
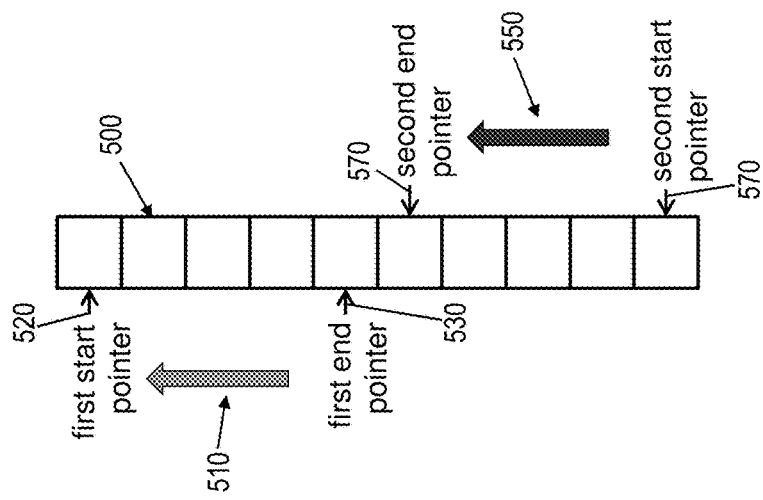
FIGS. 5A-5D illustrate a buffer for use in an inversion unit of the matching system, according to some embodiments of this disclosure.
Figure 5A:
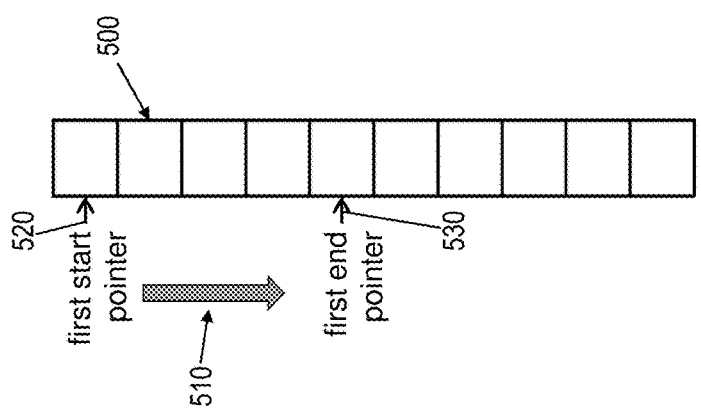

FIG. 5A illustrates the buffer 500 of the inversion unit 420 in forward mode, according to some embodiments of this disclosure. In forward mode, a first LIFO queue 510 may be growing as spans are being added to it. In the example of FIG. 5A, the first LIFO queue 510 implemented by the buffer 500 is receiving a first set of spans corresponding to leftmost regex matches found in first input data. A first start pointer 510 and a first end pointer 530 may point at positions in the buffer 500 that are part of the first LIFO queue 510. Specifically, the first start pointer 520 may point to the bottom of the first LIFO queue 510, and the first end pointer 530 may point to the top of the first LIFO queue 510. New spans for the first LIFO queue 510 may be added to the top, at the position of the first end pointer 530. Initially, the first start pointer 520 and the first end pointer 530 may point to the same end of the buffer 500, which acts as the bottom of the first LIFO queue 510. When a new span is received, the new span is added at the position of the first end pointer 530, and the first end pointer 530 may increment, moving away from the first start pointer 520. When each new span is added at the current position of the first end pointer 530, the first end pointer 530 may increment with each such new addition, allowing the first LIFO queue 510 to grow.

FIG. 5B illustrates the buffer 500 in backward mode, according to some embodiments. In backward mode, the first LIFO queue 510 may be shrinking as spans are being removed from it. Further, a second LIFO queue 550 may or may not be active. In the example of FIG. 5B, the buffer 500 is in backward mode, and the second LIFO queue 550 is active. More specifically, the second LIFO queue 550 is growing as spans of leftmost regex matches of second input data are being added to it, while the spans stored in the first LIFO queue 510 are being removed in LIFO order and output to the containment filter 230. The first end pointer 520 may continue pointing to the last span (i.e., the most recently added span) on the first LIFO queue 510. When the last span is output, the first end pointer 520 may decrement, moving back toward the first start pointer 520.

The second LIFO queue 550 may have a second start pointer 560 and a second end pointer 570, where the second start pointer 560 points to the bottom of the second LIFO queue 550 in the buffer 500, and the second end pointer 570 points to the position in the buffer 500 of the last element on the second LIFO queue 550. As a span from the first LIFO queue 510 is output and the first end pointer 530 decrements, space may open in the buffer 500 at the previous position of the first end pointer 530. Thus, the inversion unit 420 may insert a new span, corresponding to a leftmost regex match in the second input data, into the second LIFO queue 550 by inserting that new span into the buffer at the second end pointer 570 and then incrementing the second end pointer 570. As shown in FIG. 5B, the first LIFO queue 510 and the second LIFO queue 560 may thus use the same buffer 500, because one is shrinking while the other is growing.

Figure 5D:
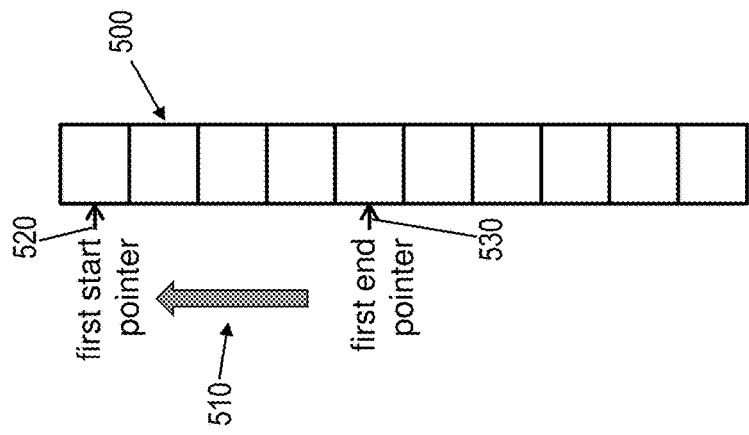
Figure 5C:
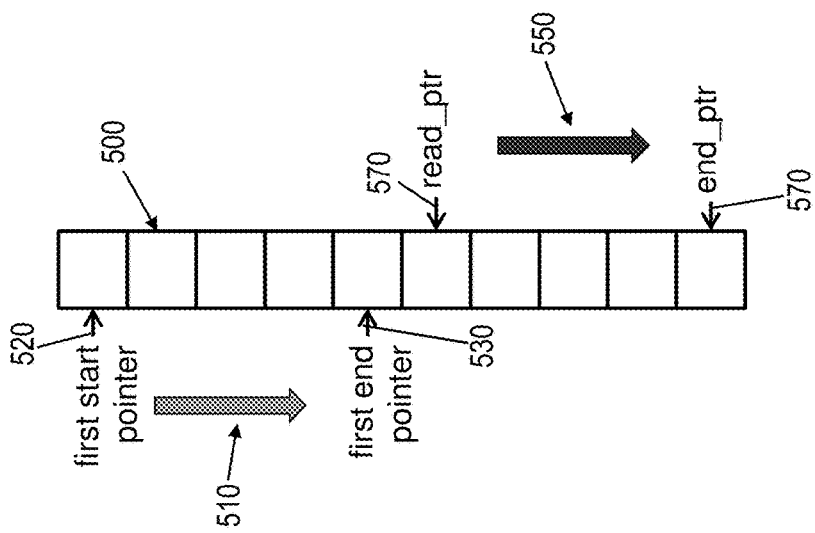

FIG. 5C illustrates another example of the buffer 500 in forward mode, according to some embodiments. In this example, however, the second LIFO queue 550 shrinks as spans are output from the end of it and the second end pointer 570 decrements, while the first LIFO queue 510 grows as a new set of spans corresponding to leftmost regex matches of third input data are received.

FIG. 5D illustrates another example of the buffer 500 in backward mode, according to some embodiments. In this example, however, the second LIFO queue 550 is empty, and the first LIFO queue 510 is shrinking as its spans are being output. This situation may occur, for example, if there are no new spans coming in from the leftmost regex matcher 410, so the inversion unit 420 need only output the spans it is already holding.

It will be understood that the situations of FIGS. 5A, 5B, 5C, and 5D may occur in sequence.

Figure 6:
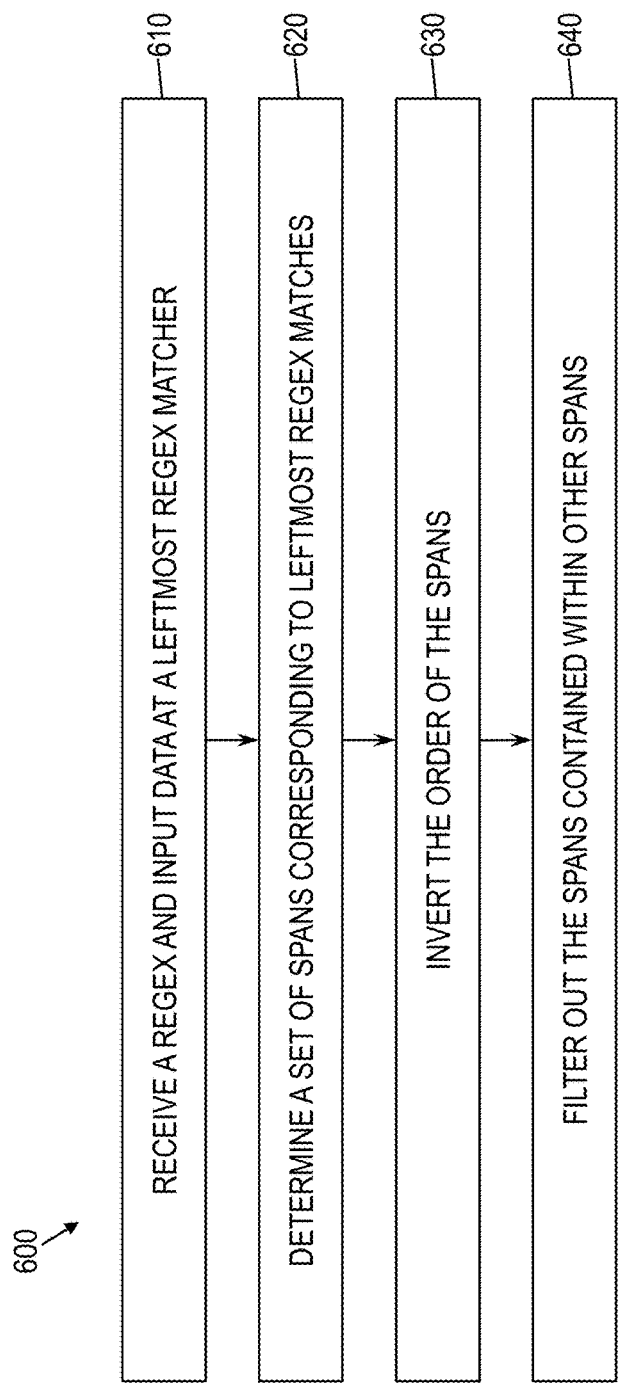
FIG. 6 is another flow diagram of a method for identifying leftmost longest regex matches, according to some embodiments of this disclosure.

FIG. 6 is a flow diagram of a method 600 of identifying leftmost longest regex matches, according to some embodiments of this disclosure. As shown, at block 610, the leftmost regex matcher 410 may receive a regex and input data, which may be an input stream. At block 620, the leftmost regex matcher 410 may determine and output a set of spans corresponding to the leftmost regex matches in the input data. At block 630, the inversion unit 420 may reverse the order of the spans corresponding to the leftmost regex matches. At block 640, the containment filter 230 may filter out the spans contained within other spans, and may thus identify the leftmost longest regex matches of the input data. It will be understood that various blocks of this method 600 may be performed in parallel as data is streamed through the leftmost regex matcher 410, the inversion unit 420, and the containment filter 230.

Some embodiments of the matching system 200 according to FIGS. 4-6 may reduce the implementation costs of natural language processing, as compared to conventional systems and as compared to the embodiments of FIG. 2. This may be achieved though applying a first filtering within the leftmost regex matcher (i.e., to filter out matches that are not leftmost), which may reduce the number of intermediate results to be subsequently buffered, and through replacing the sorting 220 unit with an inversion unit 420. Generally, the computational complexity of sorting N spans is $O(N \log(N))$, while the computational complexity of inverting N spans is $O(N)$.

Figure 7:
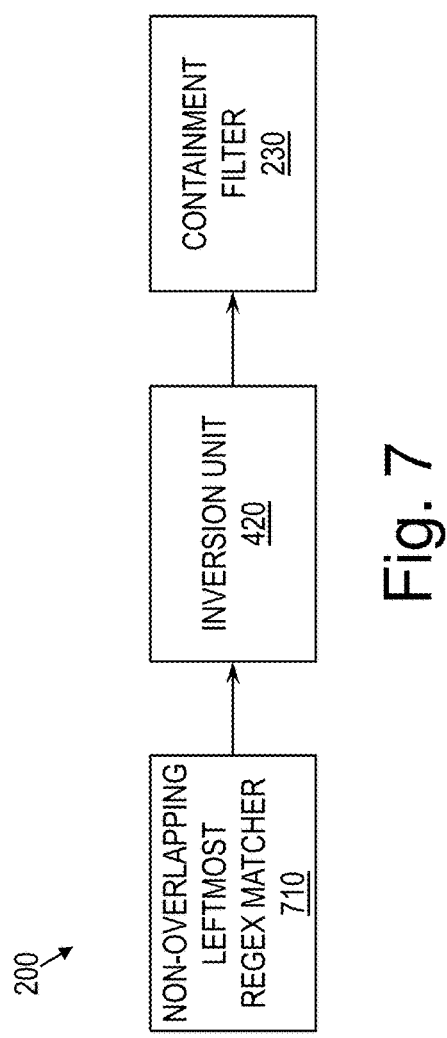
FIG. 7 is a block diagram of the matching system, for identifying non-overlapping leftmost longest regex matches, according to some embodiments of this disclosure.

FIG. 7 is another block diagram of the matching system 200, according to some embodiments of this disclosure. The embodiments discussed above may generate leftmost longest regex matches that overlap. Embodiments according to FIG. 7, however, may compute non-overlapping leftmost longest matches. As shown, the matching system 200 may include a non-overlapping leftmost regex matcher 710, an inversion unit 420, and a containment filter 230. The inversion unit 420 and the containment filter 230 may behave as described above. The non-overlapping leftmost regex matcher 710 may include hardware, software, or a combination of both. Further, although the non-overlapping leftmost regex matcher 710, the inversion unit 420, and the containment filter 230 are illustrated as being distinct, this need not be the case.

Herein, two spans $(s_0, e_0)$ and $(s_1, e_1)$ are defined as overlapping if either $(s_1 > s_0)$ and $(e_1 > e_0)$ and $(s_1 \le e_0)$, or $(s_0 > s_1)$ and $(e_0 > e_1)$ and $(s_0 \le e_1)$. Thus, in some embodiments using this definition, two spans sharing a start offset or an end offset cannot be deemed to overlap. Further, herein, the non-overlapping leftmost regex match at end offset i is the regex match with the smallest start offset that ends at position i and does not overlap with a leftmost regex match that ends at a position smaller than i. Further, a non-overlapping leftmost longest regex match is a non-overlapping leftmost regex match that is not contained by any other non-overlapping leftmost regex match.

A brute-force approach for computing non-overlapping leftmost longest regex matches is to produce spans corresponding to all possible regex matches, sort the spans, and filter out the overlapping spans. However, this brute-force approach can be avoided by adapting the architecture illustrated in FIG. 4 to produce non-overlapping leftmost matches and, subsequently, non-overlapping leftmost longest matches.

Returning back to the example of FIG. 1, the span (0, 0) is the only regex match shown at offset position 0, and this span does not overlap with any span having a prior start offset. Thus, span (0, 0) is a non-overlapping leftmost match. There are two regex matches that have an end offset of 1: (0, 1) and (1, 1). The span (0, 1) does not overlap with (0, 0) based on the above definition of overlapping. Therefore, the span (0, 1) is a non-overlapping leftmost match, and span (1, 1) is not because it is not a leftmost match. There are two regex matches that have an end offset of 2: (1, 2) and (2, 2). Because span (1, 2) overlaps with span (0, 1), it is not part of the output and may be filtered, or suppressed. Because span (1, 2) is suppressed, span (2, 2) does not get suppressed in this example, and span (2, 2) may be reported as a non-overlapping leftmost regex match.

The above scheme of outputting only non-overlapping leftmost regex matches may be implemented by using an offset counter that initially points to an end offset of 0 in the input data; iteratively computing the leftmost matches at the current position of the offset counter; incrementing the offset counter on the input data after each consumed character of the input data; and in case of a regex match that has an end offset of i, which is associated with a span $(s_0, i)$, deactivating all the ongoing searches that have start offsets greater than $s_0$. This implementation may be used by the non-overlapping leftmost regex matcher 710 of FIG. 7.

As shown in FIG. 7, the output of the non-overlapping leftmost regex matcher 710 may be used as input into the inversion unit 420, and the output of the inversion unit 420 may be input into the containment filter 230, to produce non-overlapping leftmost longest matches.

Figure 8:
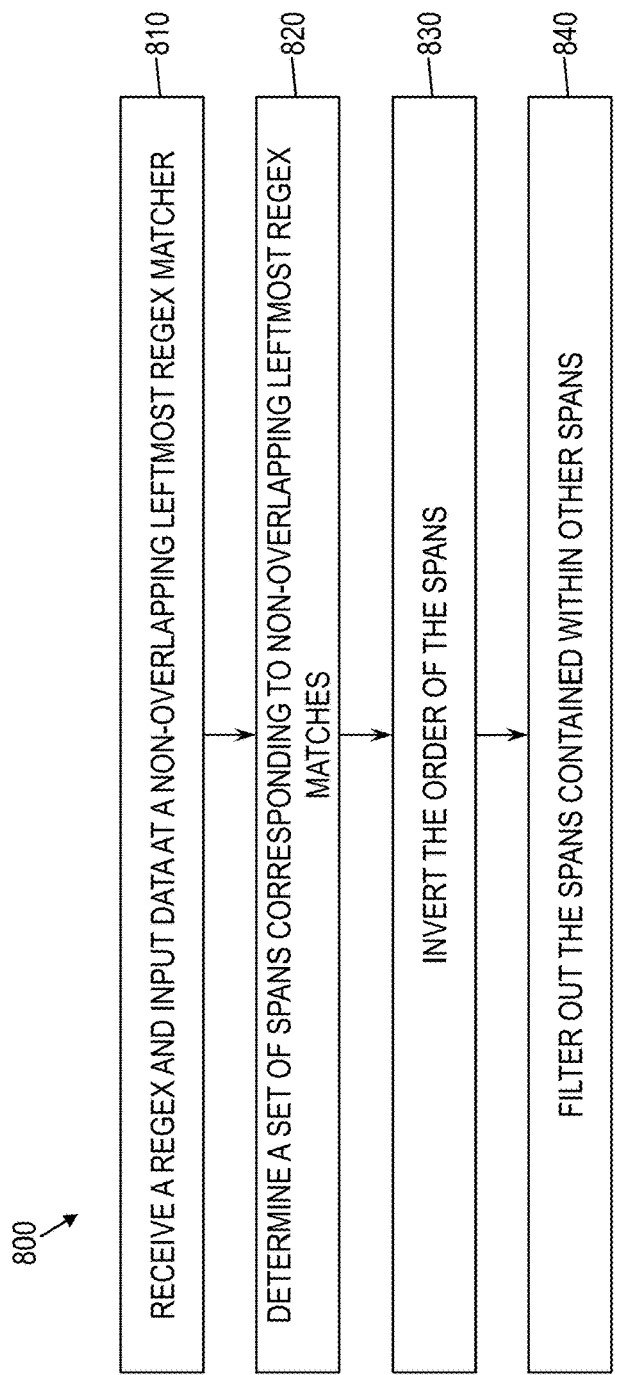
FIG. 8 is a flow diagram of a method for identifying non-overlapping leftmost longest regex matches, according to some embodiments of this disclosure.

FIG. 8 is a flow diagram of a method 800 of identifying non-overlapping leftmost longest regex matches, according to some embodiments of this disclosure. As shown, at block 810, the non-overlapping leftmost regex matcher 710 may receive a regex and input data, which may be an input stream. At block 820, the non-overlapping leftmost regex matcher 710 may determine and output a set of spans corresponding to non-overlapping leftmost regex matches in the input data. At block 830, the inversion unit 420 may reverse the order of the spans corresponding to the non-overlapping leftmost regex matches. At block 840, the containment filter 230 may filter out the spans contained within other spans, and may thus identify the non-overlapping leftmost longest regex matches of the input data. It will be understood that various blocks of this method 800 may be performed in parallel as data is streamed through the non-overlapping leftmost regex matcher 710, the inversion unit 420, and the containment filter 230.

Some embodiments of the matching system 200 according to FIGS. 7-8 may be particularly useful in the field of natural language processing, where conventional parsers produce only non-overlapping results. Thus, the matching system 200 may be an efficient replacement for some aspects of natural language processing.

Figure 9:
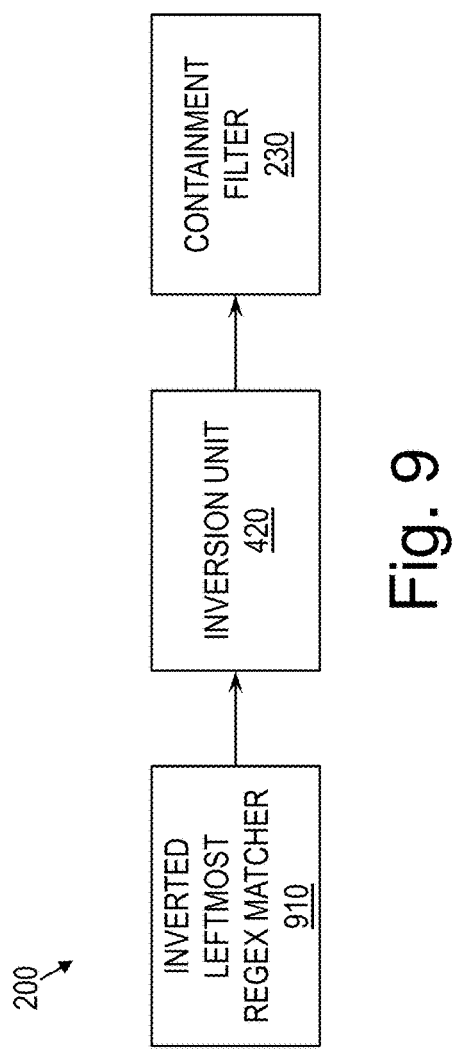
FIG. 9 is a block diagram of the matching system, for identifying rightmost longest regex matches, according to some embodiments of this disclosure.

FIG. 9 is another block diagram of the matching system 200, according to some embodiments of this disclosure. The embodiments discussed above may generate leftmost regex matches with varying restrictions, as discussed above. Embodiments according to FIG. 9, however, may compute rightmost longest regex matches. Herein, the rightmost longest regex match at position i is defined as the regex match with the largest end offset that has a start offset of i. Further, herein, a rightmost longest regex match is a rightmost regex match and is not contained by any other regex match. The non-overlapping rightmost regex match with a start offset of i is the regex match with the largest end offset that starts at position i and that does not overlap with a rightmost regex match that has a start offset greater than i. Further, a non-overlapping rightmost longest regex match is a non-overlapping rightmost regex match that is not contained by any other non-overlapping rightmost regex match.

As shown, the matching system 200 may include an inverted leftmost regex matcher 910, an inversion unit 420, and a containment filter 230. The inversion unit 420 and the containment filter 230 may behave as described above. The inverted leftmost regex matcher 910 may include hardware, software, or a combination of both. Further, although the inverted leftmost regex matcher 410, the inversion unit 420, and the containment filter 230 are illustrated as being distinct, this need not be the case.

The inverted leftmost regex matcher 910 may be implemented as an inverted finite state machine and may invert, or reverse, the input regex pattern. For instance, if the regex used as input is defined as abc, the inverted leftmost regex matcher 910 may identify matches of cba. One of skill in the art will understand how to construct the inverted leftmost regex matcher 910 based on conventional techniques.

To produce rightmost regex matches, the characters of the input data may be considered in reverse order. To this end, the input data may be fed into the inverted leftmost regex matcher 910 in reverse. In some embodiments, to achieve this, an additional inversion unit 420 may be used on the input data, and the output of this additional inversion unit 420 may be used as input into the inverted leftmost regex matcher 910.

Figure 10:
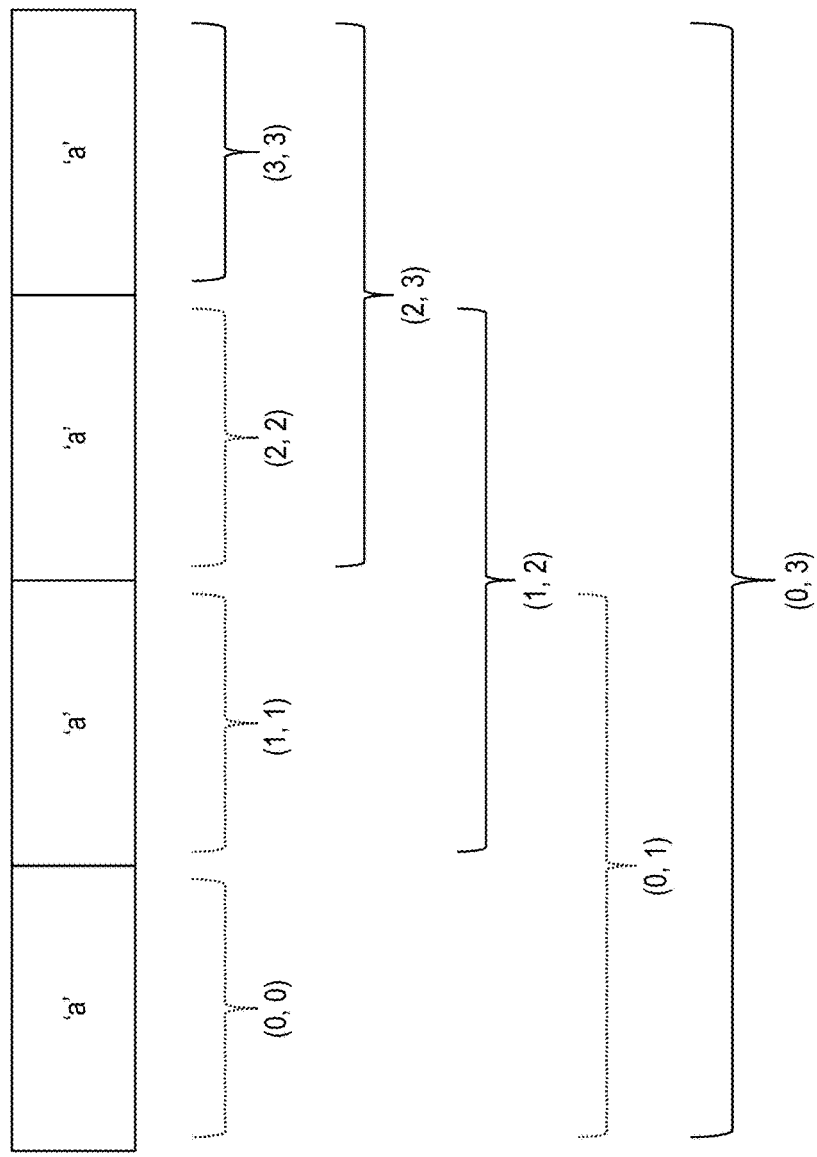
FIG. 10 is an example result of rightmost regex matching, according to some embodiments of this disclosure.

Referring back to the example of FIG. 1, FIG. 10 illustrates the result of finding rightmost longest regex matches, according to some embodiments of this disclosure. The inverted leftmost regex matcher 910 may output spans representing the rightmost regex matches of the input data. In this example, those spans are (3, 3), (2, 3), (1, 2), and (0, 3). These four rightmost regex matches are indicated in FIG. 10 by solid brackets, as opposed to the dashed brackets used to indicate the matches that are not rightmost. The inversion unit 420 may take this input and output the spans in the order {(0, 3), (1, 2), (2, 3), (3, 3)}. The containment filter 230 may filter out spans that are contained by other rightmost regex matches, thus outputting the rightmost longest regex matches. In this example, the output of the containment filter 230 is the single span (0, 3).

It will be understood that the final spans output indicate spans based on start and end offsets in the inverted input data. However, in some embodiments, these spans may be converted to spans with start and end offsets based on the original input data by subtracting based on the total number of characters in the input data. For example, if T equals the total number of characters in the input data, a span ($s_0$, $e_0$) based on positions in the inverted input data may correspond to a span (T-1-$e_0$, T-1-$s_0$) in the original input data. This conversion may be performed individually on each output span, and may thus be performed at streaming rate.

When converted back to start and end offsets of the original input data, the set of rightmost regex matches need not be equal to the set of leftmost regex matches. However, in some embodiments, the set of rightmost longest regex matches is equal to the set of leftmost longest regex matches. Further, the set of non-overlapping rightmost longest regex matches need not equal to the set of non-overlapping leftmost longest regex matches. Therefore, the choice of leftmost matching versus rightmost matching and the choice of non-overlapping matching versus overlapping matching may impact on the set of results produced.

Figure 11:
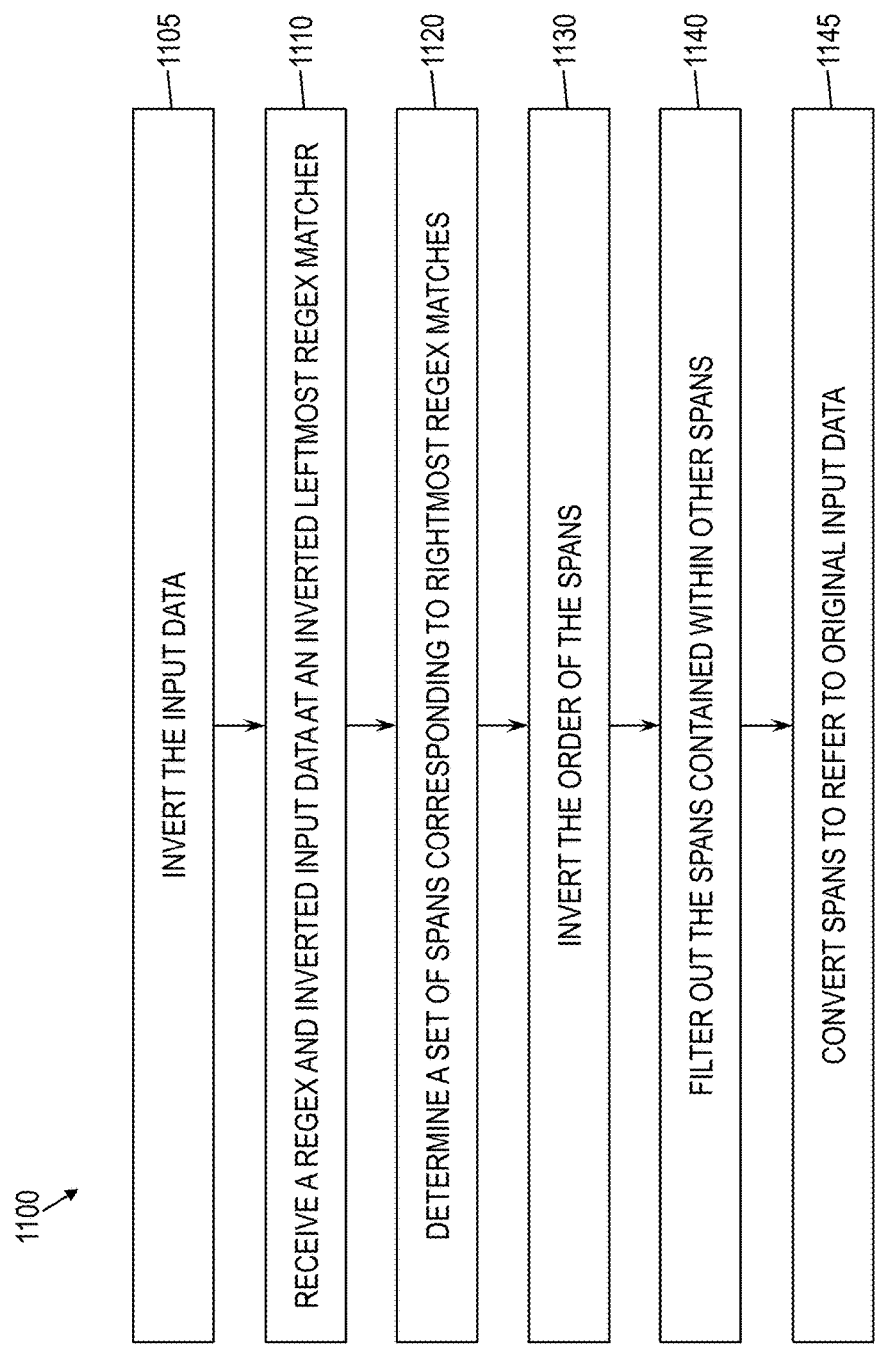
FIG. 11 is a flow diagram of a method for identifying rightmost longest regex matches, according to some embodiments of this disclosure.

FIG. 11 is a flow diagram of a method 1100 of identifying rightmost longest regex matches, according to some embodiments of this disclosure. As shown, at block 1105, the input data may be inverted. At block 1110, the inverted leftmost regex matcher 910 may receive a regex and the inverted input data. At block 1120, the inverted leftmost regex matcher 910 may determine and output a set of spans corresponding to inverse leftmost regex matches, which are matches to the inverse of the regex within an inverse of the input data. At block 1130, the inversion unit 420 may reverse the order of the spans corresponding to the inverse leftmost regex matches. At block 1140, the containment filter 230 may filter out the spans contained within other spans, and may thus identify the rightmost longest regex matches of the input data. At block 1145, the spans may be converted to refer to start and end offsets in the original input data. It will be understood that various blocks of this method 1100 may be performed in parallel as data is streamed through the inverted leftmost regex matcher 910, the inversion unit 420, and the containment filter 230.

Some embodiments of the matching system 200 according to FIGS. 9-11 may be particularly useful in natural language processing for certain languages other than English. For instance, in some languages, the most important word in a sentence appears last in that sentence, and some languages are written and read right-to-left, rather than left-to-right. Embodiments of the matching system 200 that find rightmost longest matches may be useful for parsing these languages.

Figure 12:
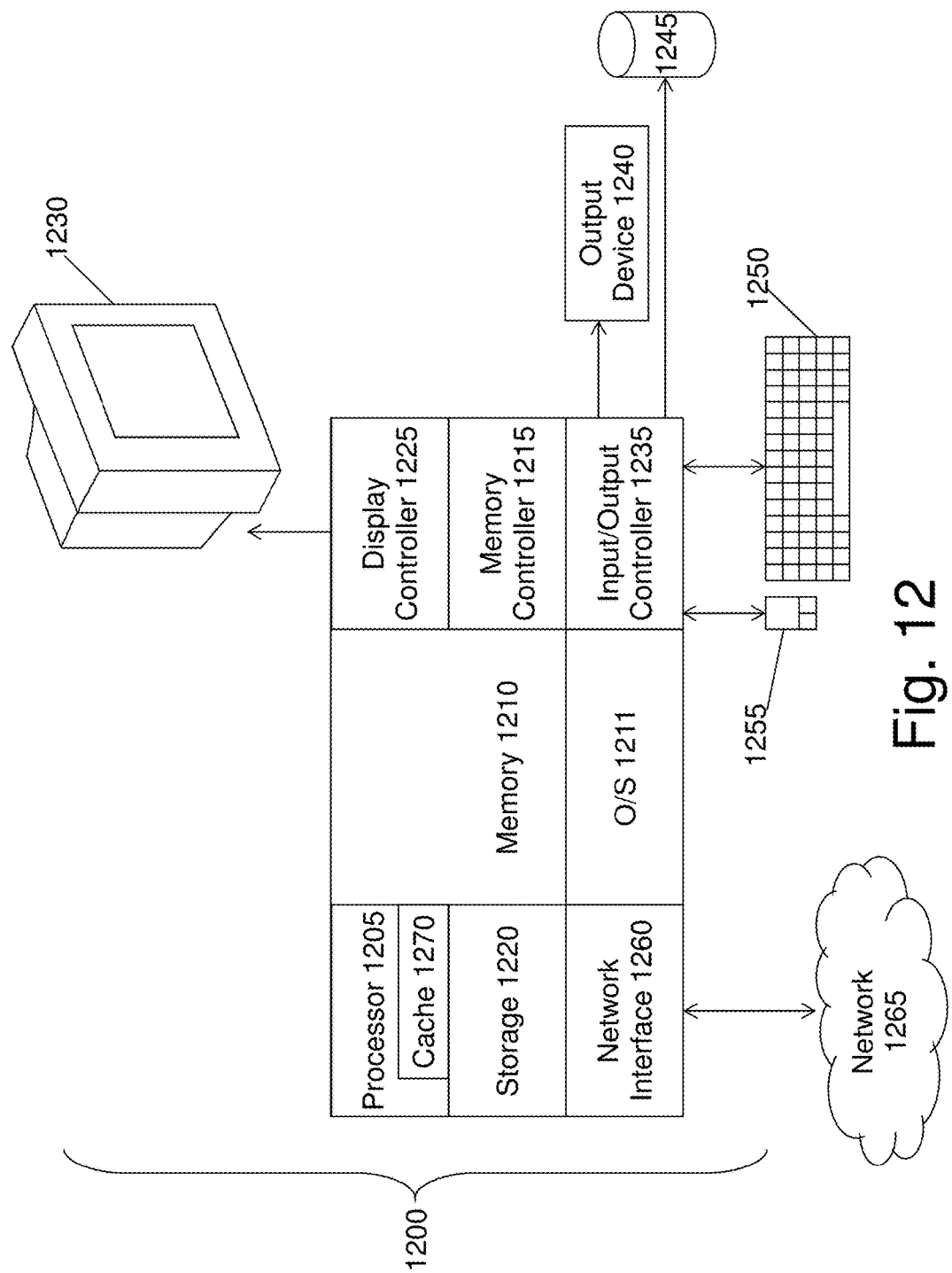
FIG. 12 is a block diagram of a computer system for implementing some or all aspects of the matching system, according to some embodiments of this disclosure.

FIG. 12 illustrates a block diagram of a computer system 1200 for use in implementing a matching system or method according to some embodiments. The matching systems and methods described herein may be implemented in hardware, software (e.g., firmware), or a combination thereof. In some embodiments, the methods described may be implemented, at least in part, in hardware and may be part of the microprocessor of a special or general-purpose computer system 1200, such as a personal computer, workstation, minicomputer, or mainframe computer.

In some embodiments, as shown in FIG. 12, the computer system 1200 includes a processor 1205, memory 1210 coupled to a memory controller 1215, and one or more input devices 1245 and/or output devices 1240, such as peripherals, that are communicatively coupled via a local I/O controller 1235. These devices 1240 and 1245 may include, for example, a printer, a scanner, a microphone, and the like. Input devices such as a conventional keyboard 1250 and mouse 1255 may be coupled to the I/O controller 1235. The I/O controller 1235 may be, for example, one or more buses or other wired or wireless connections, as are known in the art. The I/O controller 1235 may have additional elements, which are omitted for simplicity, such as controllers, buffers (caches), drivers, repeaters, and receivers, to enable communications.

The I/O devices 1240, 1245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 1205 is a hardware device for executing hardware instructions or software, particularly those stored in memory 1210. The processor 1205 may be a custom made or commercially available processor, a central processing unit (CPU), an auxiliary processor among several processors associated with the computer system 1200, a semiconductor based microprocessor (in the form of a microchip or chip set), a macroprocessor, or other device for executing instructions. The processor 1205 includes a cache 1270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 1270 may be organized as a hierarchy of more cache levels (L1, L2, etc.).

The memory 1210 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1210 may incorporate electronic, magnetic, optical, or other types of storage media. Note that the memory 1210 may have a distributed architecture, where various components are situated remote from one another but may be accessed by the processor 1205.

The instructions in memory 1210 may include one or more separate programs, each of which comprises an ordered listing of executable instructions for implementing logical functions. In the example of FIG. 12, the instructions in the memory 1210 include a suitable operating system (OS) 1211. The operating system 1211 essentially may control the execution of other computer programs and provides scheduling, input-output control, file and data management, memory management, and communication control and related services.

Additional data, including, for example, instructions for the processor 1205 or other retrievable information, may be stored in storage 1220, which may be a storage device such as a hard disk drive or solid state drive. The stored instructions in memory 1210 or in storage 1220 may include those enabling the processor to execute one or more aspects of the matching systems and methods of this disclosure.

The computer system 1200 may further include a display controller 1225 coupled to a display 1230. In some embodiments, the computer system 1200 may further include a network interface 1260 for coupling to a network 1265. The network 1265 may be an IP-based network for communication between the computer system 1200 and an external server, client and the like via a broadband connection. The network 1265 transmits and receives data between the computer system 1200 and external systems. In some embodiments, the network 1265 may be a managed IP network administered by a service provider. The network 1265 may be implemented in a wireless fashion, e.g., using wireless protocols and technologies, such as WiFi, WiMax, etc. The network 1265 may also be a packet-switched network such as a local area network, wide area network, metropolitan area network, the Internet, or other similar type of network environment. The network 1265 may be a fixed wireless network, a wireless local area network (LAN), a wireless wide area network (WAN) a personal area network (PAN), a virtual private network (VPN), intranet or other suitable network system and may include equipment for receiving and transmitting signals.

Matching systems and methods according to this disclosure may be embodied, in whole or in part, in computer program products or in computer systems 1200, such as that illustrated in FIG. 12.

Technical effects and benefits of some embodiments include the ability to identify certain types of regex matches (e.g., leftmost longest, rightmost longest, overlapping, non-overlapping) in an efficient manner. More specifically, some embodiments may operate at streaming rate and may thus be able to process input data as it arrives, without halting the stream of data. Further, some embodiments may be incorporated into hardware accelerators, and may thus decrease the load on host processors performing natural language processing or other activities that benefit from regex matching.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a regular expression (regex) and input data;
   identifying two or more spans representing two or more regex matches in which the regex matches at least a portion of the input data, wherein each span of the two or more spans corresponds to a corresponding regex match of the two or more matches and comprises a start offset of the corresponding regex match in the input data and an end offset of the corresponding regex match in the input data;
   wherein the two or more spans representing the two or more regex matches are in a sorted order of increasing start offset and decreasing end offset;
   wherein the two or more spans representing the two or more regex matches comprise a first subset of spans representing a first subset of regex matches, wherein each span in the first subset of spans is contained within at least one other span representing at least one other regex match in the two or more spans representing the two or more regex matches; and
   generating one or more filtered spans representing one or more filtered regex matches by filtering out the first subset of spans that are each contained by at least one other span in the two or more spans;
   wherein filtering out the first subset of spans that are each contained by at least one other span in the two or more spans comprises:
     storing a current span representing a current regex match;
     for each new span in the two or more spans representing the two or more regex matches according to the sorted order, wherein each new span has a start offset no smaller than the start offset of the current span:
       filtering out the new span, if the new span has a smaller end offset than the current span and a new regex match represented by the new span is contained within the current regex match represented by the current span; and
       replacing the current span with the new span, if the new span has a greater end offset than the current span and a start offset no smaller than the start offset of the current span.

2. The computer-implemented method of claim 1, wherein identifying the two or more spans representing the two or more regex matches is performed by a leftmost regex matcher, and the computer-implemented method further comprising inverting the order of the sequence of the two or more spans.

3. The computer-implemented method of claim 2, wherein inverting the order of the sequence of the two or more spans comprises:
   shrinking a first last-in-first-out (LIFO) queue within a buffer in memory, wherein the shrinking comprises removing from a first space in the buffer a first span corresponding to a match of a second regex within second input data; and
   growing a second LIFO queue within the buffer in memory, wherein growing the second LIFO queue comprises adding to the first space in the buffer a second span corresponding to a match of the regex within the input data.

4. The computer-implemented method of claim 1, wherein identifying the two or more spans representing the two or more regex matches is performed by a non-overlapping leftmost regex matcher, and the computer-implemented method further comprising inverting the order of the sequence of the two or more spans.

5. The computer-implemented method of claim 1, wherein identifying two or more spans representing two or more regex matches in which the regex matches at least a portion of the input data is performed by a leftmost regex matcher that inverts the regex, and is performed on an inverted version of the input data, and the computer-implemented method further comprising inverting the order of the sequence of the two or more spans.

6. The computer-implemented method of claim 5, wherein the one or more filtered spans each comprise a start offset of an inverted version of the regex within the inverted version of the input data and an end offset of the inverted version of the regex with the inverted version of the input data, the method further comprising:
    converting each of the one or more filtered spans to a corresponding final span comprising a start offset in the input data and an end offset in the input data.

7. The computer-implemented method of claim 1, wherein, in filtering out the first subset of spans that are each contained by at least one other span in the two or more spans:
    for each new span in the two or more spans according to the sorted order:
        storing the current span comprises storing the current span in one or more local registers of a hardware accelerator;
        filtering out the new span if the new span has a smaller end offset than the current span comprises filtering out the new span if the new span has a smaller end offset then the current span stored in the one or more local registers of the hardware accelerator; and
        replacing the current span with the new span if the new span has a greater end offset than the current span comprises replacing the current span in the one or more local registers of the hardware accelerator with the new span if the new span has a greater end offset than the current span stored in the one or more local registers of the hardware accelerator.

8. The computer-implemented method of claim 7, wherein the identifying and the generating are performed at streaming rate.

\* \* \* \* \*